(12) United States Patent
Wedl

(10) Patent No.: US 9,734,469 B2
(45) Date of Patent: Aug. 15, 2017

(54) SYSTEM AND METHOD FOR STATE-TRANSITION-CONTROLLED PROCESSING OF OBJECTS

(71) Applicant: Swiss Reinsurance Company Ltd., Zurich (CH)

(72) Inventor: Boris Wedl, Zurich (CH)

(73) Assignee: Swiss Reinsurance Company Ltd., Zurich (CH)

( * ) Notice: Subject to any disclaimer, the term of this patent is extended or adjusted under 35 U.S.C. 154(b) by 966 days.

(21) Appl. No.: 14/038,470

(22) Filed: Sep. 26, 2013

(65) Prior Publication Data

US 2015/0012116 A1   Jan. 8, 2015

Related U.S. Application Data

(63) Continuation of application No. PCT/EP2013/064041, filed on Jul. 3, 2013.

(51) Int. Cl.
*G06Q 10/06* (2012.01)
(52) U.S. Cl.
CPC .................................. *G06Q 10/06* (2013.01)
(58) Field of Classification Search
None
See application file for complete search history.

(56) References Cited

U.S. PATENT DOCUMENTS

2014/0249882 A1* 9/2014 Li ................... G06Q 10/06313
                                                705/7.23

* cited by examiner

*Primary Examiner* — Sean Shechtman
(74) *Attorney, Agent, or Firm* — Oblon, McClelland, Maier & Neustadt, L.L.P.

(57) ABSTRACT

A control device and method for state-transition-based processing of objects following a state-structured process flow with a plurality of process states. For each process state one or more tasks are selected in order to process the transition of a selected object from one process state to the subsequent process state. State parameters of the selected object are captured and the current process state of the object is determined based on the captured state parameters. The tasks are generated for a specific process state in dependence on assigned task parameters of a process task. Operating tags are assigned to a process task and include dynamically alterable operating parameters adding operational constraints to the processing of the process task. The state-structured process flow is dynamically generated and processed by triggering defined threshold and/or trigger values and/or steering the processing of the process tasks based on the operating parameters of the operating-tags.

34 Claims, 2 Drawing Sheets

SYSTEM AND METHOD FOR STATE-TRANSITION-CONTROLLED PROCESSING OF OBJECTS

CROSS-REFERENCE TO RELATED APPLICATIONS

This application is a Continuation of PCT International Application No. PCT/EP2013/064041, filed Jul. 3, 2013, the entire contents of which are incorporated herein by reference.

FIELD OF THE INVENTION

The present invention relates to systems for providing automated real-time interaction and state-transition-controlled processing of objects by means of a central control system and for enabling this system to provide process, process operation, process modeling/adapting and process management monitoring and related capabilities for processes executing and operating in systems external to those aforementioned.

BACKGROUND OF THE INVENTION

A workflow or process-flow comprises the technical and/or procedural steps required for executing a particular real-world process on an object, the technical and other means to conduct the processing steps, and the transfer and flow of data/signaling between the means and/or steps to execute the process on the object. Each step is defined by a set of processes, activities or tasks that need to be conducted. Within a workflow, objects (e.g., products, technical objects, data, claims, accounts, jobs etc.) pass through the different steps in the specified order from start to finish, and the processes at each step are executed either by dedicated technical processing devices or means, by system functions (also, e.g., computer program products) or by dedicated signaling to specific people to perform activities on the object. Workflow systems can be set up using a visual front end or can be hardcoded, and their execution is delegated to a workflow execution engine that handles the invocation and signal generation of the remote devices or applications.

In the prior art, workflow systems are technically split into four broad families, namely (i) production workflow systems, (ii) computational workflow systems, (iii) scientific workflow systems and (iv) business workflow systems. The production or industrial process systems are dedicated to steering and executing processing of technical objects, such as devices or products, by steering and operating appropriate devices for executing the activities of the workflow steps; the computational process systems serve for functional processing and computation of data objects; the business process systems serve for the automated control of business processes inter alia by signal generation to people conducting the process steps; and finally, scientific workflow systems serve for acting as middleware in the scientific research process and typically have properties of all three mentioned control and data workflow systems. Workflow systems usually provide numerous capabilities for the monitoring of workflow processes, which are modeled and executed within the workflow system. Such capabilities can include, for example, analysis tools for the measurement and display of metrics with respect to the status of the processes, times to execute work steps in the processes, and bottlenecks in the processes. These capabilities can also be transferred to the workflow system for workflow processes, which execute in systems external to the workflow system.

All four families of workflow systems comprise as the core the mentioned workflow execution engine, a process management system or a similar control device/system controlling and monitoring the processing of the objects. The workflow execution engine of the workflow systems is typically implemented as a processor-based automation of the process flow, i.e., the industrial or production processes, the business processes, the data or computational process and the scientific processes represented by the steps of the workflow. The workflow execution engine steers a sequence of activities (work tasks), interactions and signaling with execution devices or means, or in interaction with human resources (users) or IT resources (software applications and databases), as well as rules controlling the progression of processes through the various stages associated with each activity.

At the various stages of the process, especially in business workflow systems, activities may require human interactions: typically user data entry through a form. They may also interact with IT applications or data sources to exchange information in various formats, such as files, e-mails, database content, etc. For certain workflow systems, one of the ways to automate and operate the steering and monitoring of the processes by means of the workflow execution engine is to develop appropriate processor codes and applications that lead a processor-based workflow execution engine for execution of the required steps of the process; however, in practice, such workflow execution engines are rarely able to accurately or completely execute all the steps of the process by means of the workflow system. To solve this problem, in the prior art, the typical approach is to use a combination of software and human intervention; however, this approach is more complex, making the reproducibility, the predictability, and even the information flow and documentation process difficult.

Another problem in the prior art system is that workflows are difficult to generate dynamically. However, at a certain process step in the workflow, it may be necessary to adapt the processing by steps which are not predictable at the beginning of the process flow or workflow and which may depend on environmental parameters or operational parameters of the execution devices or other state parameters of a certain workflow state. To cope with this problem, in the prior art, specialized software has been developed with the goal to enable the translation of possible process steps into a computer operation code, wherein the source code is processed by an interpreter for execution by the processors. The system will either use services in connected applications to perform operations or, when a step is too complex to automate, will ask for human input. However, interpreting the source code requires limited computing resources and takes time. Because the source code must be interpreted for execution, the execution of a not preimplemented process is time consuming or, even worse, not possible to be put in execution in an automated manner by the workflow system.

SUMMARY OF THE INVENTION

It is an object of the invention to provide a system and method for state-transition controlled processing of objects by means of an appropriate control system, which do not have the drawbacks of the prior art. In particular, it is an object of the present invention to provide a system, which is more capable of capturing the external and/or internal factors that may affect the processing of an object within a workflow and which is more capable of being operated by externally or internally occurring boundary conditions or constraints. Further, it is an object of the invention to provide a system which is able to dynamically react to changing environmental or internal conditions or measuring parameters that are possibly not known or predictable at the beginning of the workflow process, in particular without human interaction.

According to the present invention, these objects are achieved particularly through the features of the independent claims. In addition, further advantageous embodiments follow from the dependent claims and the description.

According to the present invention, the above-mentioned objects for multi-tier, state-transition-based processing are particularly achieved by selecting an object by means of a control system and processing the object following a state-structured process flow comprising a plurality of process states, wherein for each process state one or more process tasks are executed by means of the control system in order to process the selected object from one process state to the subsequent process state, characterized in that state parameters of the selected object are captured by capturing means of the control system, and a process state is determined based on the captured state parameters and assigned to the selected object, in that based on the process state and/or state parameters of the selected object at least one process task is generated by means of the control system, wherein for a specific process state, a generated process task is activated in dependence on task-parameters assigned to a process task, in that one or more operating tags are generated and expandably assigned to a process task or process flow, the operating-tags comprising dynamically alterable operating parameters controlling the operation of an associated process task by means of the control system and/or adding operational constraints to the processing of the process task and/or expanding or augmenting or indicating task states, and in that the state-structured process flow is dynamically operated by the control system, wherein by means of the control system, an object is processed from a process state to a subsequent process state by executing the assigned process tasks based upon the operating parameters of the operating tags. The control system can also receive process events or tasks from external processes, such as applications and systems, execution devices, assignees or assigners, process visibility systems and/or the process management engine. Changes in the process flow can be induced by the execution of one or more tasks. However, process and tasks are independently realized in the system, wherein possible relations between process or process flow and the execution of one or more tasks are implemented as constraints. The control system can also receive alert events from internal or external processes, such as applications and systems, execution devices, assignees or assigners via the interface module, process visibility systems, the capturing means and/or the process management engine. The operating tags can comprise operational message data, wherein the different components of the present system understand the operational messages, i.e. e.g. the process management engine, the runtime execution device, the control system etc. By means of the operational message data of the operating-tags, process tasks initiated by the control system and/or assignees and/or assigners and/or external processes etc. can process operations on process-flow of the object, process management and monitoring processes. As mentioned, operational message data can be passed between components of the control system in order to facilitate their cooperation. Operational message data can also carry updates derived from the state of the capturing means or an external process to control the flow of a process. Additionally, operational message data can update the data values of a monitoring process. Such a monitoring processes typically can respond to these operational message data similar to traditional process-steps or work-steps in control and steering systems. A selected object can comprise, e.g., at least one product and/or technical object and/or data and/or claim and/or account and/or job and/or contract and/or request and/or reporting object etc. The processing of the selected object can be monitored and/or displayed by means of the control system based upon at least the captured state parameters, the task parameters and/or operating parameters. By means of the control-system, the state-structured process flow can be dynamically generated and adapted, wherein the selected object is processed by means of the control system initiating a subsequent process state by triggering defined trigger values of the operating parameters and/or task parameters and/or state parameters of the preceding process state. As a variant, for the state transition of a selected object in the process flow, a process task is split by means of subtasks, wherein a subtask is generated by the control system initiated by or generated based upon at least one of the operating parameters of the assigned operating tags of the process task. For example, in a three-tier implementation, the first-tier execution of the control system comprises the generation of the process states, the second-tier execution of the control system comprises the generation and association of the process tasks and the third-tier execution comprises the generation of the operating tags, wherein the processing of the object and the appropriate signaling by the control system is dynamically adapted by alternating the operating parameters of the associated operating tags. As a variant, the task parameters can be captured at least partly via a plurality of input devices accessible by users of the control system for state-transition-based processing of objects by means of the interface module of the control system. Further, the task parameters can be captured, e.g., via the plurality of input devices and interface modules, wherein the task parameters can comprise task parameters for initiating the generation of a new process task. The invention has inter alia the advantage that an object can be processed in a state-structured process flow wherein the state-structured process flow can be fully controlled and operated by the control system. Further, it has the advantage that applied process tasks of a process state of the process flow can be further controlled by means of the assigned operating tags, wherein operational constraints or splitting of specific tasks can be controlled by the operating tags with operating parameters. Dynamic assignment of operating tags allows dynamic adaption of the process flow during the processing of a selected object, i.e., an object processed in the process flow. This also has the advantage that the control system implemented as a dynamically adaptable system can be automatically optimized without any additional technical or human intervention. The present control system for state-transition-controlled processing of objects for responsive process management allows operators to have real-time visibility of their processes (executing both within and external to the platform), to model and dynamically adapt their processes, execute those processes by execution devices and appropriate signaling to those devices, sense and respond to external events, and incrementally improve those processes. This is not possible with the systems, as know in the state of the art.

In one embodiment variant, control and steering signaling is generated by means of a signaling module and transmitted to associated runtime execution modules, wherein the selected object is processed by executing the activated process tasks by means of the runtime execution modules based on the transmitted control and steering signaling. A state transition of the process flow can be processed, e.g., by the control system based upon at least one operating parameter of an assigned operating tag, wherein operational constraints to the execution and/or related signaling generation by means of the signaling module are steered based on the specific value of said operating parameter. The control system and the runtime execution modules can e.g. interact in runtime, wherein the object is processed based on the dynamically adapted process flow with the generated process tasks and alterable operating parameters of the associated operating tags by executing the activated process tasks by means of the runtime execution modules based on the transmitted control and steering signaling. Further, the control system, e.g., can comprise said signaling module, wherein appropriate signaling is generated by means of the signaling module for steering the execution devices processing the selected object according to the process flow generated by the control system. This embodiment variant has inter alia the advantage that any processing of an object can be handled fully automatically by means of the control system. In that way, the control system can automatically control, steer and operate the processing of a selected object within the process flow based on the different state transitions of the selected object, wherein the control system processes the objects by means of steering and signal transmission to the execution modules or devices.

In a further embodiment variant, the control system comprises an historic engine device for assessing and steering the state-structured process flow, wherein historic data of past state-structured process flows are stored in a storing device of the control system, wherein the stored historical data are compared to the present process flow, and relevant historic process flow data are filtered from the stored data by means of a filter-module, wherein the historic engine device and the control system are connected by a data link for data signaling transmission between the control system and the historic engine device, and wherein the state-structured process flow is dynamically generated by the control system and the selected object dynamically processed based on the data signaling transmission from the historic engine device and based on the operating parameters and/or task parameters and/or state parameters triggered by defined threshold and/or trigger values. This embodiment variant has inter alia the advantage that the control system provides an improved process flow based on the comparison with historical data. This also allows an automatic adaption and optimization of the system and the generated process flow, which is not possible in this manner with the system known from the prior art.

In another embodiment variant, the state-structured process flow is a discrete time stochastic control process, wherein the control system comprises a stochastical rating module, and wherein the initiation of the next process tasks are based at least on the selection of the process tasks of the preceding process state and an additional rating by means of the stochastical rating module. This embodiment variant has inter alia the advantage that the control system can generate and adapt the process flow automatically and also steer and operate external devices by appropriate signal generation.

In yet another embodiment variant, the control system is self-adapted by automatically capturing the operating parameters of the associated operating tags by the capturing means of the control-system. For example, the control system can comprise measuring devices and/or measuring sensors for capturing the operating parameters of the associated operating tags. Further, the control system can comprise measuring devices and/or measuring sensors for capturing the state parameters of the selected object. This embodiment variant has inter alia the advantage that it reacts automatically to internal or external conditions relevant to the processing of an object in the process flow and operates without human interaction. Further, this has the advantage that the processing of an object can be fully automated by the present control system.

In yet another embodiment variant, task parameters for initiating the generation of a new process task are dynamically generated based on captured operating parameters and/or task parameters and/or state-parameters, wherein the process flow is self-adapted by the control system by the generation of the new process tasks. This embodiment variant has inter alia the advantage that any processing of an object can be handled fully automatically without any interaction by an operator, assigner and/or assignee of tasks or tags. Furthermore, the embodiment variant has the advantage that the control system can be operated in a self-adapting way, reacting automatically on internal or external conditions relevant to the processing of an object in the process flow.

In addition to a system, as described above, and a corresponding method, the present invention also relates to a computer program product that includes computer program code means for controlling one or more processors of the control system in such a manner that the control system performs the proposed method, and relates in particular to a computer program product that includes a computer-readable medium containing therein the computer program code means for the processors.

BRIEF DESCRIPTION OF THE DRAWINGS

The present invention will be explained in more detail, by way of example, with reference to the drawings in which.

123 to the next process state 121,122,123 can also be independent of the execution of a process tasks 131 based on a certain process flow 12.

DETAILED DESCRIPTION OF THE PREFERRED EMBODIMENTS

Figure 1:
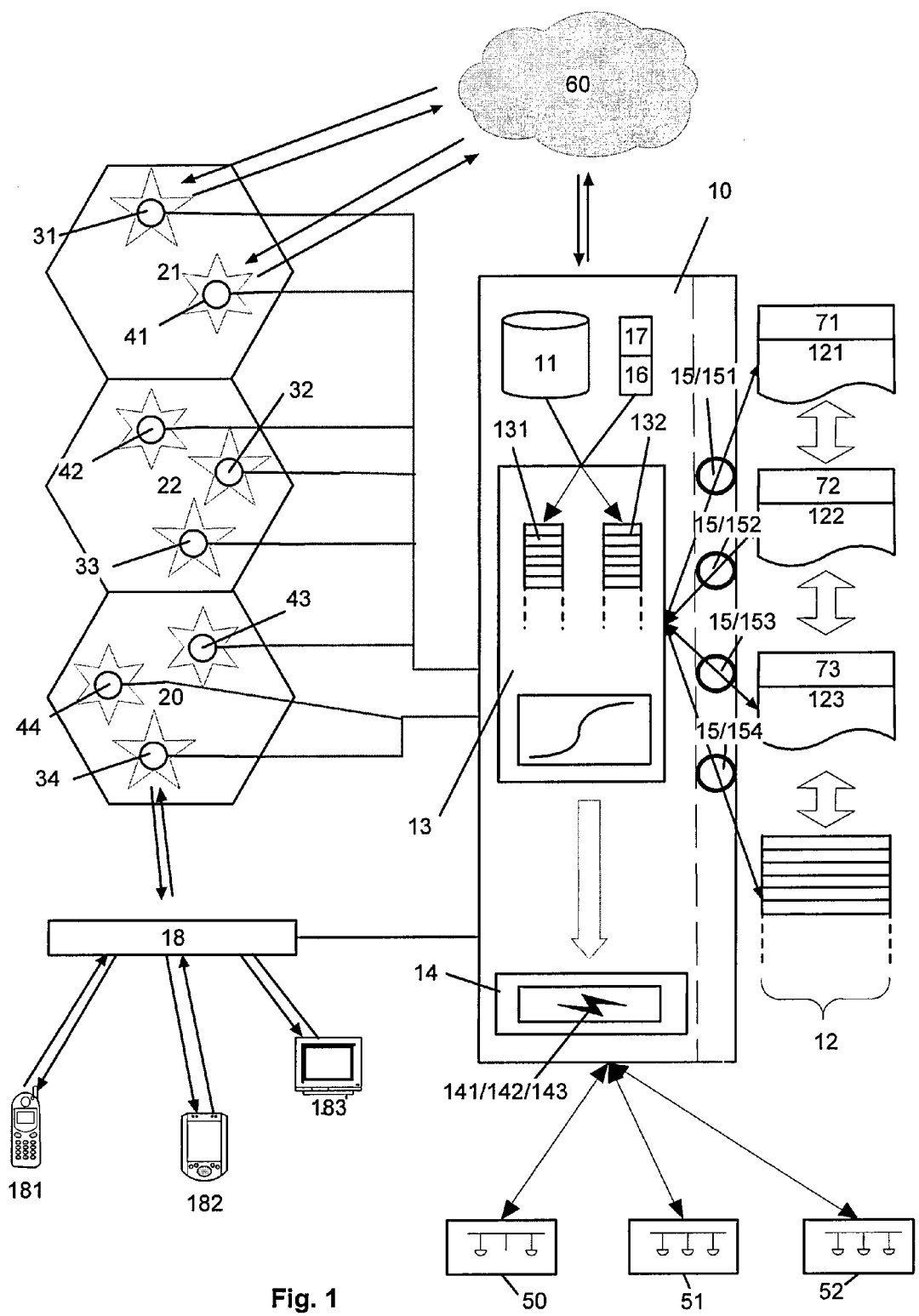
FIG. 1 shows a block diagram illustrating schematically an exemplary system according to the invention for state-transition-controlled processing of objects 71,72,73, wherein by means of a control system 10, an object 71,72,73 is selected and processed following a state-structured process flow 12 comprising a plurality of process states 121, 122,123. For each process state 121,122,123, one or more process tasks 131 are executed by means of the control system 10, wherein the selected object 71,72,73 is processed from one process state 121,122,123 to a subsequent process state 121,122,123. Operating tags 132 control by dynamically alterable operating parameters the operation of an associated process task 131 by means of the control system 10 and/or adding operational constraints to the processing of the process task 131 and/or indicating task states.
Figure 2:
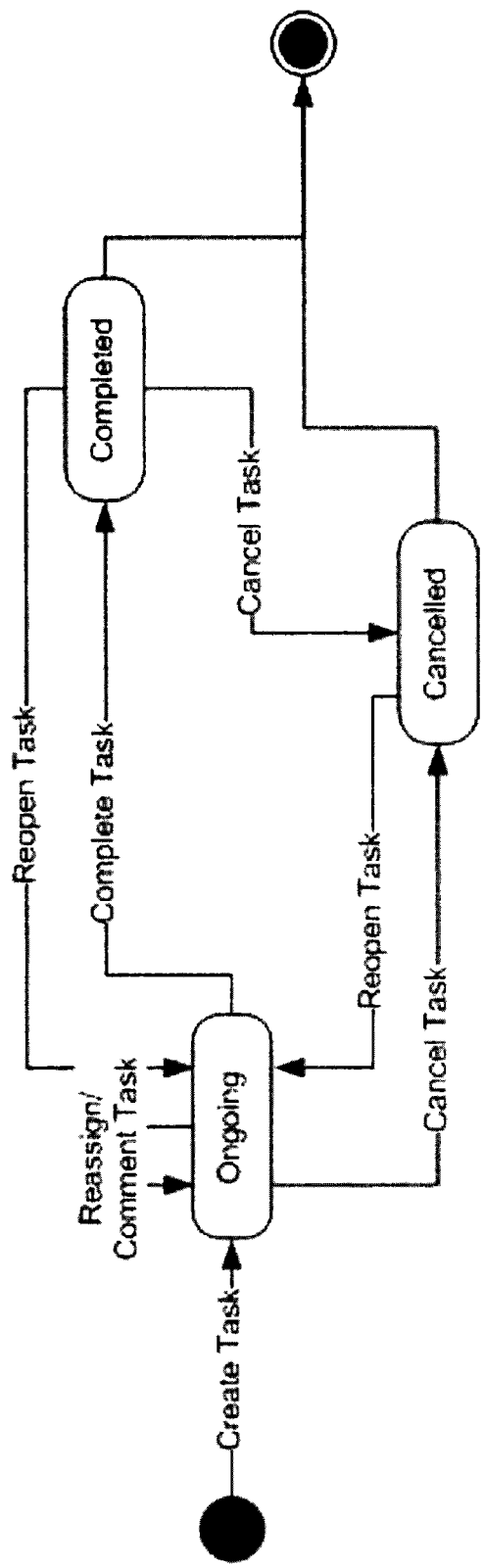
FIG. 2 shows a block diagram illustrating schematically an exemplary state transition of a process task 131, wherein for each process state 121,122,123, one or more process tasks 131 are executed by means of the control system 10 in order to process the selected object 71,72,73 from one process state 121,122,123 to a subsequent process state 121,122,123. Changes in the process flow can be induced by the execution of one or a plurality of tasks. However, process and tasks are independently realized in the system, wherein possible relations between process or process flow and the execution of one or more tasks are implemented as constraints. Therefore, the change of a process state 121,122.

FIG. 1 illustrates schematically an architecture for a possible implementation of an embodiment of the electronic control system or control apparatus 10 and a method for state-transition-controlled processing of objects 71,72,73. In FIG. 1, reference numeral 10 refers to the inventive control system. The control system 10 is implemented based on underlying electronic components, steering codes and interacting interface devices such as, e.g., signal generation modules, or other module interacting electronically by means of appropriate signal generation between the different modules, devices or the like. A selected object 71,72,73 can comprise, e.g., at least one product and/or technical object and/or data and/or claim and/or account and/or job. An object 71,72,73 is selected by means of a selecting or filtering module of the control system 10 and processed following a state-structured process flow 12 and/or process life cycle comprising a plurality of process states 121,122, 123. For each process state 121,122,123, one or more process tasks 131 is executed by the control system 10 in order to process the selected object 71,72,73 from one process state 121,122,123 to a subsequent process state 121,122,123. Changes in the process flow can be induced by the execution of one or a plurality of tasks. However, process and tasks are independently realized in the system, wherein possible relations between process or process flow and the execution of one or more tasks are implemented as constraints. The process tasks 131 do not have to be necessarily generated by the control system 10, but can as embodiment variant also be inserted or imported from external means as denoted databases with appropriate predefined process tasks or input means as consoles for manual entries etc. The process—or workflow—12 based control system 10 comprises the technical and/or procedural steps required for executing the state transition-controlled processing of objects 71,72,73, the technical and other means to conduct the processing steps, and the transfer and flow of data/signaling between the means and/or steps to execute the process on the objects 71,72,73. The objects 71,72,73 are processed by a set of processes or tasks that need to be conducted. Within a process flow 12, objects 71,72,73 (e.g., products, technical objects, data, claims, accounts, jobs etc.) pass through the different tasks and process states 121,122, 123 in the specified order from start to finish, and the tasks are executed either by dedicated technical processing devices or means, by specified control system 10 functions instructing a processor device, or by dedicated signaling to specific people to perform activities/tasks on the object. For executing the process flow 12, the control apparatus 10 comprises a process management engine 13. The generation of a specific process flow 12, i.e. the process management process definition, can be generated, e.g., based on a desired process at a process management generator of the process management engine 13. As described in detail below, the process flow 12 can be generated dynamically (state by state) based upon at least measuring parameters of the capturing means 15,151, . . . ,154 and/or data transmitted via the interface module 18 and the input devices 181,182,183, e.g. entered by assigners 31, . . . ,34 or assignees 41, . . . ,44 of process tasks 131. The generated process flow 12 is dynamically or partly dynamically translated into a processor source code, e.g., Java source code or the like, at a translator engine of the process management engine 13. The source code can then be compiled into a byte code at a compiler engine of the process management engine 13. Finally, a virtual machine of the processing device or a processor-driven, -steered or -operated device of the control system 10 can be configured to execute the byte code. Such devices can comprise execution devices of the process tasks 131 such as, e.g., the runtime execution modules 50,51,52. Therefore, the process flow 12 is modeled and generated by means of the process management engine 13, including or based upon specific processing rules and technical instructions 131,132 stored in the database 11. A man skilled in the art understands, that the term of the technical instructions 131,132 has to be interpreted broadly, comprising all technical necessary information, data, specification or operational parameters to allow the processing rules to be executed by the system.

The process flow 12 operation or management according to this invention is the automated operation of industrial, scientific, computational or business processes by means of the central control apparatus 10. It is composed of a sequence of activities (process- or worktasks 131), interactions with execution devices 50,51,52, capturing means 15 as measuring devices 151, . . . ,154 and/or human resources (users such as, e.g., assigners 31, . . . ,34 and assignees 41, . . . ,44), or electronic resources (processors, software codes and data storage means or databases 11), as well as rules controlling the progression of processes through the various stages associated with its activities such as, e.g., the process tasks 131 and operating tags 132. The processing of the selected object 71,72,73 can be monitored by means of dedicated monitoring and/or measuring devices of the control system 10 based upon at least the captured state parameters, the task-parameters and/or operating parameters. The control system 10 can be implemented using one or a plurality of visual front ends. The execution of the tasks is controlled, steered and operated by means of the control system 10 or a dedicated process flow 12 execution engine that handles the invocation and signal generation of the remote devices or applications. The control system 10 can be implemented, e.g., based on a three-tier structure, wherein the first-tier execution of the control system 10 comprises the generation of the process states 121,122,123, the second-tier execution of the control system 10 comprises the generation and association of the process tasks 131 and the third-tier execution comprises the generation of the operating tags 132, wherein the processing of the object 71,72,73 and the appropriate signaling 141,142,143 by the control system 10 is dynamically adapted based on at least the alterable operating parameters of the associated operating tags 132. The reference numeral 141 represents the appropriate signaling dedicated to the runtime execution module 50, 142 the signaling for runtime execution module 51 and 143 the signaling for runtime execution module 52.

State parameters of the selected object 71,72,73 are captured by capturing means 151,152,153,154 of the control system 10, and a process state 121,122,123 is determined based on the captured state parameters. The determined process state 121,122,123 is assigned to the selected object 71,72,73 by the control system 10. Based on the determined process state 121,122,123 and/or state parameters of the selected object 71,72,73, at least one process task 131 is generated by means of the control system 10, wherein for a specific process state 121,122,123, a generated process task 131 is activated in dependence on task-parameters assigned to a process task 131. The control system 10, e.g., can generate one or more process tasks based on the process state 121,122,123 of the selected object 71,72,73, wherein the process task 131 is selectable from a defined, finite number of process tasks 131.

One or more operating tags 132 are generated and expendably assigned to a process task 131 and/or process state 121,122,123 and/or process flow 12. The operating tags 132 comprise dynamically alterable operating parameters controlling the operation of an associated process task 131 by means of the control system 10 and/or by adding operational constraints to the processing of the process task 131. In particular, the operating parameters are assigned to task states such as, for example, "pending" or "processing" or "in operation" or "done" or "cleared". Aside from the task states, the operating tags 132 can also be state-independently assigned to process tasks 131 or process flow and/or take on itself an operating tag's state or operating tag's value. Based on at least one of the operating parameters of the operating tags 132 assigned to the process task 131, a process task 131, e.g., can be split by means of corresponding subtasks, which is generated by the control system 10. Analogously, an operating tag 132 can also be assigned to the process and process state 121,122,123, respectively. As embodiment variant, the operating tags 132 themselves can possess tag-states influencing the operation of the process flow 12. Operating tags 132 can also be externally set by an authorized assigner 31, . . . ,34 or assignee 41, . . . ,44 of a process task 131. The generation of the subtasks can be conducted automatically, if the control system 10 triggers and/or detects predefinable values of the state parameters and/or task parameters and/or operating parameters.

In different embodiment variants, the operating tags 132 may vary in their realization. For example, (i) An operating tag 132 can be simply a date with the states 'due' and 'overdue'. This can result in a state change by the control system 10 by a) sending follow-up notifications to user(s) (i.e. assigner 31, . . . ,34 and/or assignee 41, . . . ,44) and/or b) highlighting the task when displayed to the user(s); (ii) An operating tag 132 can denote an aspect of work e.g. Pricing, Contractual, Reporting, etc. with the states 'pending' and 'done'. This can result in a state change by the user by a) dropping off a respective (per aspect of work) tasks from a user's view upon receiving the state done (e.g. also while keeping it in the view of other users), b) preventing the promotion of the task to completed unless all respective aspects are denoted 'done'. (The same concept can be applied for organizational units), (iii) An operating tag 132 can denote the supervision by a user or a group of users e.g. 'Supervisor (user id)' with the states 'watching' or 'escalation-pending', 'escalation-approved'. This can result in a state change by the user (i.e. assigner 31, . . . ,34 and/or assignee 41, . . . ,44) and/or the control system 10 by a) triggering follow-up notifications to user(s), b) preventing the promotion of the task in case of 'escalation-pending'. (The same can be applied for tags like 'Approver (user id)' with states 'pending', 'approved', 'rejected'); (iv) An operating tag 132 can denote the requirement to retain the audit trail of a task (or process) with the states 'none', 'retained', 'expired'. This can result in a state change by the control system 10 by preventing deletion of the respective task; (v) Operating tags 132 can assuming that the states 'included' and 'excluded' can be applied for e.g. SLA (Service Level Agreement) calculations or other reporting purposes. This can result in a state change by the user (i.e. assigner 31, . . . ,34 and/or assignee 41, . . . ,44) and/or the control system 10 by determining whether a task is considered during reporting. (Note, that the application of 'included' vs. 'excluded' states can be broader than that for appropriate embodiment variants); and (vi) A tag can denote the level of protection with the states 'public' or 'confidential'. This can result in a state change by the user and/or the control system 10 by constraining the access to a particular task to any or a constrained group of users. Generally, the operating tags 132 and their states will provide the user the ability to access and report his/her tasks along the applied dimensions following a single consistent model.

The control system 10 can receive process events or tasks from external processes, such as systems and applications, execution devices 50,51,52, assigners 31, . . . ,34 or assignees 41, . . . ,44, process visibility systems and/or internal devices such as the process management engine 13. The control system 10 can also receive alert events from internal or external processes, such as systems and applications, execution devices 50,51,52, assigners 31, . . . ,34 or assignees 41, . . . ,44 via the interface module, process visibility systems, the capturing means 15 and/or the process management engine 13 etc. The operating tags 132 can comprise operational message data, wherein the different component of the present system understand the operational message data, i.e. for example the process management engine 13, the runtime execution devices 50,51,52, the control system 10 etc. By means of the operational message data of the operating-tags 132, process tasks 131 initiated by the control system 10, assigners 31, . . . ,34 or assignees 41, . . . ,44, external processes etc. can process operations on process-flow, process management and monitoring processes. The possibilities of interaction with the system by assigners 31, . . . ,34 or assignees 41, . . . ,44 can comprise constraints based on the user area 20, . . . ,22 a specific assigner 31, . . . ,34 or assignee 41, . . . ,44 is assigned to. A user area 20, . . . ,22 represent a business unit and/or a operational affiliation of an assigner 31, . . . ,34 or assignee 41, . . . ,44 and/or a level of authorization of an assigner 31, . . . ,34 or assignee 41, . . . ,44. However, a user area 20, . . . ,22 can denote any classification or differentiation, which may be needed to operate the process flow. As mentioned, operational message data can be passed between components of the control system 10 and also between the control system 10 and external devices in order to facilitate their cooperation. Operational message data can also carry updates derived from the state of the capturing means 15 or an external process to control the flow of a process. Additionally, operational message data can update the data values of a monitoring process. Such a monitoring processes typically can respond to these operational message data similar to traditional process-steps or work-steps in control and steering systems.

The state-structured process flow 12 is dynamically operated by the control system 10, wherein by means of the control system 10, the selected object 71,72,73 is processed from the determined process state 121,122,123 to a subsequent process state 121,122,123 by executing the assigned process tasks 131 based upon the operating parameters of the operating tags 132. The state-structured process flow 12 can be operated, e.g., by a signaling module 14 of the control system 10 generating appropriate control and steering signaling 141,142,143 which is transmitted to associated runtime execution modules 50,51,52. The runtime execution modules 50,51,52 are operated and steered by the transmitted signaling 141,142,143, wherein a selected object 71,72, 73 is processed by executing the process tasks 131 associated to the process state of the selected object 71,72,73 by means of the runtime execution modules 50,51,52 based on the transmitted control and steering signaling 141,142,143.

The state transition of an object 71,72,73 in the process flow 12 can be processed, e.g., by the control system 10 based upon at least one operating parameter of an assigned operating tag 132, wherein operational constraints to the execution and/or related signaling generation by means of the signaling module 14 are steered based on the specific value of said operating parameter. The control system 10 and the runtime execution modules 50,51,52, e.g., can interact in runtime, wherein the object 71,72,73 is processed based on the dynamically adapted process flow 12 by the generated process tasks 131 and the alterable operating parameters of the associated operating tags 132 by executing the activated process tasks 131 by means of the runtime execution modules 50,51,52 based on the transmitted control and steering signaling 141,14,143 and/or assignees 41, . . . ,44 of a process task 131.

The control system 10 can operate dynamically by dynamically generating the process states 121,122,123 of the process flow 12 or at least partially dynamic by adapting a generated process flow 12 based on measuring parameters captured by the capturing means 15,151, . . . ,154, as already described. However, the control apparatus 10 can also operate internally in a two-phase modus: a construction or generation phase and an execution phase. The construction phase comprises the analysis, design, definition and generation of a specific process flow 12 and its activities by means of a process management engine 13. Interfaces with execution devices 51,52,53 and/or an interface module 18 and/or signaling module 14 and/or capturing means 15/151, . . . ,154 and/or an execution code, applications and data sources can also be built during this phase. The execution phase is the instantiation of a process and the execution and operation of its activities and interactions by means of an execution engine and appropriate signal generation by means of the signaling module 14. During this phase, processes can additionally be monitored and administered by means of a graphical console, for example, by assigners 31, . . . ,34 and/or assignees 41, . . . ,44. The construction phase is implemented and processed by the process management engine 13, which includes process generation and design encompassing the identification of existing processes, process tasks 131 and operation tags 132, and the generation of "to-be" processes, process tasks 131 and/or operation tags 132. The control apparatus 10 can include graphical user interfaces for representation of the process flow, the actuators within it, alerts and notifications, escalations, standard operating procedures, service level agreements, process tasks 131, handover mechanisms, etc. With the graphical user interface, the control system 10 provides a responsive process management system allowing to have real-time visibility of ongoing processes and process tasks executed on a selected object 71,72,73 in the process flow 12. The real-time process visibility provides operators, users, assigners 31, . . . ,34 and/or assignees 41, . . . ,44 with the ability to see and know how its control systems 10 infrastructure is operating, thereby in particular providing answers to questions such as where are the bottlenecks, where are processes getting stuck, and what is causing problems in the control system's 10 infrastructure or in associated devices. The control system 10 allows the users to respond to external and internal events to sense threats and opportunities and also to predict future process states and process tasks. The control system 10 provides for process flow 12 improvements through the automated monitoring, analysis, modeling, and execution of process flows 12 on an object 71,72,73.

The process management engine 13 comprises processor-driven modules or devices, as described above. These processor-driven modules can be implemented by means of one or more general-purpose processing devices such as a microprocessor, central processing unit, or the like. In particular, said processor-driven devices can comprise complex instruction set computing microprocessors, reduced instruction set computing microprocessors, very long instruction word microprocessors, or processors implementing other instruction sets, or processors implementing a combination of instruction sets. Said processor-driven devices can also comprise one or more special purpose processing devices such as an application-specific integrated circuit, a field-programmable gate array, a digital signal processor, network processor, etc. The processor-driven devices are configured to execute the execution codes, as mentioned above, and for performing the operations and steps discussed there. The processor-driven devices can also comprise further hardware or software or a combination of both. Data storage devices 11 for storing inter alia execution codes, the process flow 12, state parameters of the process states 121,122,123, tasks parameters or the process tasks 131, measuring parameters of the capturing means 15,151, . . . ,154, operation parameters of the operating tags 132, etc. can comprise a non-transitory computer-accessible storage medium on which is stored the mentioned data and execution codes. Said data can also reside, completely or at least partially, within another dedicated memory of the process management engine 13 during execution thereof by the control system 10, wherein the process management engine 13 also constitutes computer-accessible storage media. The storage medium accessible by the processor-driven devices of the process management engine 13 can comprise, e.g., a single medium or multiple media (e.g., a centralized or distributed database, and/or associated caches) that store the one or more sets of instructions. The processor-accessible storage medium can comprise any medium that is capable of storing, encoding or carrying a set of instructions for execution by the machine and that causes the machine to perform any one or more of the methodologies of the present invention. The processor-accessible storage medium can comprise, but is not limited to, solid-state memories, optical and magnetic media.

The control system 10 can comprise, e.g., measuring devices and/or measuring sensors 151,152,153,154 for capturing the operating parameters of the associated operating tags 132. Further, the control system 10 can comprise measuring devices and/or measuring sensors for capturing the state parameters and/or task parameters and/or operating parameters of the selected object 71,72,73. Additionally or alternatively, the task parameters are at least partly captured via a plurality of input devices 181,182,183 accessible by users of the control system 10 for state-transition-based processing of objects 71,72,73 by means of the interface module 18 of the control system 10. The users can comprise assigners 31, . . . ,34 of one or more process tasks 131 and/or assignees 41, . . . ,44 of process tasks 131. The input devices 181,182,183 can comprise one or more data processing units, displays and other operating elements such as a keyboard and/or a computer mouse or another pointing device. As mentioned, the users can be assigners 31, . . . ,34 or assignees 4, . . . ,44 of a process task transmitting, assigning or receiving data to and from the control system 10 by the input devices 181,182,183, which can be connected with the control system 10 directly or via a data transmission network 60. Therefore, the control system 10 and/or the input devices 181,182,183 and/or execution modules 50,51, 52 can be connected via a network 60 for signal transmission. The network can comprise, e.g., a telecommunication network as a wired or wireless network, e.g., the Internet, a GSM-network (Global System for Mobile Communications), an UMTS-network (Universal Mobile Telecommunications System) and/or a WLAN (Wireless Local Area Network), a Public Switched Telephone Network (PSTN) and/or dedicated point-to-point communication lines. The control system 10 and/or the input devices 181,182,183 and/or execution modules 50,51,52 can also comprise a plurality of interfaces to connect to the communication network 60 according to the transmission standard or protocol.

The task parameters captured via the plurality of input devices 181,182,183 and the interface module 18 can comprise task parameters for initiating the generation of a new process task 131. The state-structured process flow 12, e.g., is dynamically generated and adapted by dynamically generating, based on a certain process state, the subsequent process state 121,122,123. The selected object 71,72,73 is processed by means of the control system 10 that initiates a subsequent process state 121,122,123, for example, by triggering defined trigger values of the operating parameters and/or task parameters and/or state parameters of the preceding process state 121,122,123.

As an embodiment variant, the control system 10 comprises an historic engine device 16 for assessing and steering the state-structured process flow 12. Historic data of past state-structured process flows 12 are stored in a storing device 11 of the control system 10. The stored historical data are compared to the present process flow 12, and relevant historic process flow data from the stored data are filtered by means of a filter module 17. The historic engine device 16 and the control system 10 are connected by a data link for data signaling transmission between the control system 10 and the historic engine device 16. In this embodiment variant, the state-structured process flow 12 is dynamically generated by the control system 10 and the selected object is dynamically processed based on the data signaling transmission from the historic engine device 16 and based on the operating parameters and/or task parameters and/or state parameters triggered by defined threshold and/or trigger values.

In a further embodiment variant, the state-structured process flow 12 is implemented as a discrete time stochastic control process, wherein the control system 10 comprises a dedicated stochastical rating module, and wherein the initiation of the next process tasks 131 is based at least on the selection of the process tasks 131 of the preceding process state 121,122,123 and an additional rating by means of the stochastical rating module. In another embodiment variant, the objects 71,72,73 comprise claims to be processed, and the control system 10 can further comprise, e.g., a dedicated loss resolving unit which comprises any kind of damage recovery modules and/or automated repair nodes, and which can in particular be implemented as an automated claim resolve unit, comprising the appropriate means for electronic accounting, billing and other transactions for compensation of losses. The damage recovery modules can also comprise monetary-based damage compensation, which is electronically assigned to a certain claim selected as object 71,72,73 by the control system 10. The loss resolving units can also comprise dedicated repair nodes comprising automatic or semiautomatic systems to maintain operation or to recover loss in the case of a loss associated with a claim processed by the control system 10.

A further automation of the control system 10 can be implemented in that the control system 10 is at least partly self-adapted by means of automatically capturing of the operating parameters of the associated operating tags 132 by the capturing means 151,152,153,154 of the control-system 10. The capturing means 151,152,153,154 can comprise all kind of physical or analytic measure devices, in particular all kind of sensors and data capturing or data filtering devices. For the processing of the object 71,72,73, e.g., at least one task parameter can be dynamically generated based on captured operating parameters and/or task parameters and/or state parameters for initiating the generation of a new process task 131, wherein the process flow 12 is self-adapted by the control system 10 by the generation of the new process tasks 131. One or more task parameters can be dynamically generated based on captured operating parameters and/or task parameters and/or state parameters for initiating the generation of a new process task 131, wherein the process flow 12 is self-adapted by the control system 10 by the generation of the new process tasks 131. In particular, the control system 10 can scan dynamically for measurement parameters by means of the capturing means 151,152,153,154.

If the control apparatus 10 is used to process objects 71,72,73 of management consulting, banking, insurance etc., services or the environment, i.e., is used to perform and operate a business workflow on a selected object 71,72,73, such environment requires the combined use of a complex set of resources and personnel to serve a client's needs. The resources and personnel needed to meet a client's needs vary throughout a particular process flow, and are distributed across disparate physical and electronic/digital locations. The control apparatus 10 allows to cope in an automated manner with such a complex environment without the need of identifying and then leveraging those resources and personnel needed to meet a client's needs at a given step in a business process, which demands significant computing and network resources and time in the prior art systems. With today's business and technology requirements, as well as with the trend away from centrally located resources and personnel, creating an efficient collaboration infrastructure that effectively identifies and leverages a business' best personnel and resources for a given task while minimizing the drain on available computing and network resources is not possible with the prior art systems in the manner the control system 10 can achieve this. However, the processor-driven control system 10 and method can be used as a core steering and operating element in automated systems of all four categories, namely production workflow systems, computational workflow systems, scientific workflow systems and business workflow systems in order to process an object 71,72,73 by means of a state-transition-controlled process. The control system 10 allows identifying, operating and embedding collaboration resources in an automated manner into processes and applications so as to achieve top and bottom-line results. Therefore, the control system 10 and corresponding method can be applied to many different industries' process flows 12, banking process flows 12, insurance process flows 12, utility process flows 12, etc., and provides a significant impact inter alia, where, for example, the following circumstances may be present: Highly complex and/or exception-driven processes; value is based on speed of turnaround; scarce computing and network resources are critical to success; and remote physical presence is required.

The invention claimed is:

1. A method for state-transition-controlled processing of objects wherein, via a control system, an object is selected and processed following a state-structured process flow including a plurality of process states, for each process state at least one process task is executed, and the selected object is processed from one process state to a subsequent process state, the method comprising:

capturing state parameters of the selected object;

determining a process state based on the captured state parameters;

assigning the process state to the selected object;

generating, via a processor, based on the process state and at least one of state parameters of the selected object, the at least one process task;

activating, for a specific process state, a process task of the at least one process task based on task parameters assigned to the process task;

generating and expendably assigning one or more operating tags to the activated process task or process flow, the one or more operating tags including dynamically alterable operating parameters controlling at least one of operation of an associated process task, adding operational constraints to processing of the process task, and expanding or indicating task states;

processing an object from the determined process state to the subsequent process state by executing the activated process task based on the operating parameters of the operating tags; and monitoring, via the control system, the processing of the selected object based upon at least one of the captured state parameters, the task parameters and the operating parameters, and dynamically generating and adapting, via the control system, the state-structured process flow based on the monitoring, the state structured process flow being an industrial product processing flow, wherein the control system controls execution of the state-structured process flow and is self-adapting by automatically capturing, via measuring sensors, the operating parameters of the associated operating tags, and the processing of the selected object and appropriate signaling by the control system is dynamically adapted by altering the operating parameters of the one or more assigned operating tags.

2. The method according to claim 1, wherein a subsequent process state is initiated by triggering at least one of defined trigger values of the operating parameters, task parameters, and state parameters of a preceding process state.

3. The method according to claim 1, wherein for state transition of the state-structured process flow, the activated process task is split via subtasks, wherein a subtask is generated based on at least one of the operating parameters of the operating tags assigned to the activated process task.

4. The method according to claim 1, further comprising:

generating control and steering signaling transmitting the control and steering signaling to associated runtime execution modules, wherein the selected object is processed by executing the activated process task via the runtime execution modules based on the transmitted control and steering signaling.

5. The method according to claim 1, wherein state transition of an object in the state-structured process flow is processed based upon at least one operating parameter of an assigned operating tag, wherein at least one of operational constraints to execution and related signaling generation are steered based on the specific value of the at least one operating parameter.

6. The method according to claim 1, further comprising:

assessing and steering, via a historic engineering device, the state-structured process flow;

storing, in memory, historic data of past state-structured process flows;

comparing the stored historical data to the state-structured process flow;

filtering relevant historic process flow data from the stored historical data, wherein the historic engine device and the control system are connected by a data link for data signaling transmission between the control system and the historic engine device;

dynamically generating the state-structured process flow and the processed selected object based on the data signaling transmission from the historic engine device and at least one of the operating parameters, task parameters and state parameters triggered by defined threshold or trigger values.

7. The method according to claim 1, wherein the state-structured process flow is a discrete time stochastic control process, and initiation of subsequent process tasks is based at least on selection of process tasks of a preceding process state and an additional rating.

8. The method according to claim 4, wherein the control system and the runtime execution modules interact in runtime, wherein the selected object is processed based on the dynamically adapted state-structured process flow with the activated process task and alterable operating parameters of the associated operating tags by executing the activated process task via the runtime execution modules based on the transmitted control and steering signaling.

9. The method according to claim 1, wherein a first-tier execution of the control system includes generation of the process states, a second-tier execution of the control system includes generation and association of the at least one process task, and a third-tier execution includes generation of the operating tags.

10. The method according to claim 1, wherein at least one of measuring devices and the measuring sensors capture the operating parameters of the associated operating tags.

11. The method according to claim 1, wherein the measuring sensors capture at least one of the state parameters and task parameters of the selected object.

12. The method according to claim 1, wherein the task parameters are at least partly captured via a plurality of input devices accessible by users of the control system for state-transition-based processing of objects via an interface module of the control system.

13. The method according to claim 12, wherein the task parameters captured via the plurality of input devices and the interface module include task parameters for initiating the generation of a new process task.

14. The method according to claim 12, wherein at least one task parameter is dynamically generated by the control system based on at least one of captured operating parameters, task parameters and state parameters for initiating the generation of a new process task, wherein the state-structured process flow is self-adapted by the control system via generation of new process tasks.

15. The method according to claim 1, wherein the control system includes a signaling module, wherein appropriate signaling is generated via the signaling module for steering execution devices processing the selected object according to the state-structured process flow generated by the control system.

16. The method according to claim 1, wherein the selected object includes at least one of at least one product, technical object, data, claim, account and job.

17. The method according to claim 1, wherein the processing of the selected object is monitored via at least one of dedicated monitoring and measuring devices of the control system based upon at least one of at least the captured state parameters, the tasks parameters and operating parameters.

18. A system for conducting state-transition-controlled processing of objects comprising:
a control system configured to, via circuitry,
select and process an object following a state-structured process flow having a plurality of process states;
execute, for each process state, at least one process task in order to process the selected object from one process state to a subsequent process state;
capture state parameters of the selected object;
determine a process state based on the captured state parameters;
assign the process state to the selected object;
generate at least one process task based on at least one of the process state and state parameters of the selected object,
activate, for a specific process state, a generated process task of the at least one process task based on on task parameters assigned to the process task;
generate one or more operating tags and expendably assign the generated operating tags to the activated process task, the operating tags including dynamically alterable operating parameters controlling at least one of operation of an associated process task via the control system, adding operational constraints to the processing of the process task and expanding or indicating task states, and
monitor the processing of the selected object based upon at least one of the captured state parameters, the task parameters and the operating parameters, and dynamically generate and adapt the state-structured process flow based on the monitoring, the state structured process flow being an industrial product processing flow,
wherein the control system controls execution of the state-structured process flow and is self-adapting by automatically capturing, via measuring sensors, the operating parameters of the associated operating tags, and the processing of the selected object and appropriate signaling by the control system is dynamically adapted by altering the operating parameters of the one or more assigned operating tags,
wherein an object is processed from the process state to the subsequent process state by executing the activated process task based upon the operating parameters of the operating tags.

19. The system according to claim 18, wherein the control system processes the selected object by initiating a subsequent process state based on at least one of triggering defined trigger values of the operating parameters, task parameters and state parameters of a preceding process state.

20. The system according to claim 18, wherein the activated process task includes one or more subtasks for splitting the activated process task based on captured operating parameters, wherein a subtask is generated based on at least one of the operating parameters of the assigned operating tags of the activated process task.

21. The system according to claim 18, wherein the circuitry generates, via a signaling module, control and steering signaling and transmits the signaling to associated runtime execution modules, wherein the selected object is processed by executing the activated process task via the runtime execution modules based on the transmitted control and steering signaling.

22. The system according to claim 18, wherein the processing of a state transition of an object in the state-structured process flow is based upon at least one operating parameter of an assigned operating tag, wherein operational constraints to at least one of the execution and related signaling generation via the signaling module are steered based on a specific value of the at least one operating parameter.

23. The system according to claim 21, wherein
the circuitry assesses and steers, via a historic engine device, the state-structured process flow,
historic data of past state-structured process flows is stored in memory,
the stored historical data is compared to the state-structured process flow and relevant historic process flow data are filtered from the stored data,
the historic engine device and the control system are connected by a data link for data signaling transmission between the control system and the historic engine device, and
the state-structured process flow is dynamically generated by the control system and the selected object dynamically processed based on the data signaling transmission from the historic engine device and based on at least one of the operating parameters, task parameters, and state parameters triggered by at least one of defined threshold and trigger values.

24. The system according to claim 18, wherein the state-structured process flow is a discrete time stochastic control process, and wherein initiation of subsequent process tasks is based at least one of selection of process tasks of a preceding process state and an additional rating.

25. The system according to claim 21, wherein the control system includes a transmitter interacting in runtime with the runtime execution modules, wherein the object is processed based on the dynamically adapted state-structured process flow with the generated process task and alterable operating parameters of the associated operating tags by executing the activated process task via the runtime execution modules based on the transmitted control and steering signaling.

26. The system according to claim 18, wherein a first-tier execution of the control system includes the generation of the process states, a second-tier execution of the control system includes the generation and association of the activated process task, and a third-tier execution includes the generation of the operating tags, wherein the processing of the object and the appropriate signaling is dynamically adapted by alternating the operating parameters of the associated operating tags.

27. The system according to claim 18, wherein the measuring sensors capture the operating parameters of the associated operating tags.

28. The system according to claim 18, wherein the control system measuring sensors capture at least one of the state parameters and task parameters of the selected object.

29. The system according to claim 18, wherein the control system includes a plurality of input devices for at least partly capturing at least one of one or more task parameters and operating parameters, wherein the input devices are accessible by users of the control-system for state-transition-based processing of objects via an interface module of the control system.

30. The system according to claim 29, wherein the task parameters captured via the plurality of input devices and the interface module include task parameters for initiating the generation of a new process task.

31. The system according to claim 29, wherein the control system dynamically generates the task parameters for initiating the generation of a new process task based on at least one of captured operating parameters, task parameters and state parameters, wherein the process flow is self-adapting by the control system by the generation of the new process tasks.

32. The system according to claim 18, wherein the control system includes a signaling module, wherein appropriate signaling is generated via the signaling module to steer execution devices processing the selected object according to the process flow generated by the control system.

33. The system according to claim 18, wherein a selected object includes at least one of at least one product, technical object, data, claim, account and job.

34. The system according to claim 18, wherein the control system includes at least one of dedicated monitoring and measuring devices that monitor the processing of the selected object based upon at least one of the captured state parameters, the task parameters and operating parameters.

* * * * *